(No Model.)

G. W. ZEIGLER.
CLAMPING PLATE FOR TIMBER STRUCTURES.

No. 409,546. Patented Aug. 20, 1889.

WITNESSES:

INVENTOR
George W Zeigler
BY
ATTORNEY

UNITED STATES PATENT OFFICE.

GEORGE W. ZEIGLER, OF PHILADELPHIA, PENNSYLVANIA.

CLAMPING-PLATE FOR TIMBER STRUCTURES.

SPECIFICATION forming part of Letters Patent No. 409,546, dated August 20, 1889.

Application filed May 13, 1889. Serial No. 310,606. (No model.)

*To all whom it may concern:*

Be it known that I, GEORGE W. ZEIGLER, a citizen of the United States, residing at Philadelphia, in the county of Philadelphia and State of Pennsylvania, have invented certain new and useful Improvements in Washers for Clamped Timber Structures; and I do hereby declare the following to be a sufficiently full, clear, and exact description thereof as to enable others skilled in the art to make and use the said invention.

This invention relates to the securing together of parts of frame-works and scaffolds formed of wood, and has for its object the prevention of sliding or slipping between the parts thereof and the avoidance of the labor of cutting holes, mortises, or gains in the lumber and the consequent weakening of the timbers due to such cutting.

To effect these desiderata this invention consists in plates of ductile metal having prongs or teeth cut in and bent or raised above the surfaces thereof, which teeth, sinking into the surfaces of the timbers between which such plates are placed and clamped, procure such a firm hold therein that the sliding of the timbers upon the plates is prevented.

The construction and practical application of this invention to use are illustrated in the accompanying drawings, in which—

Figure 1:
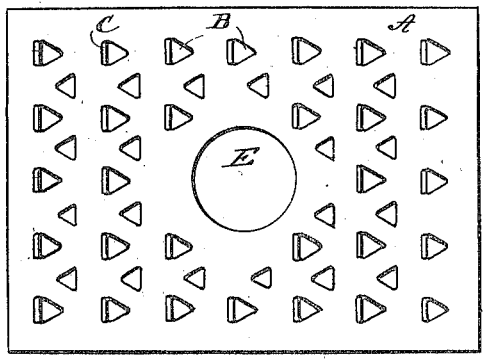
Figure 2:
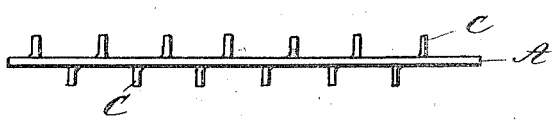
Figure 3:
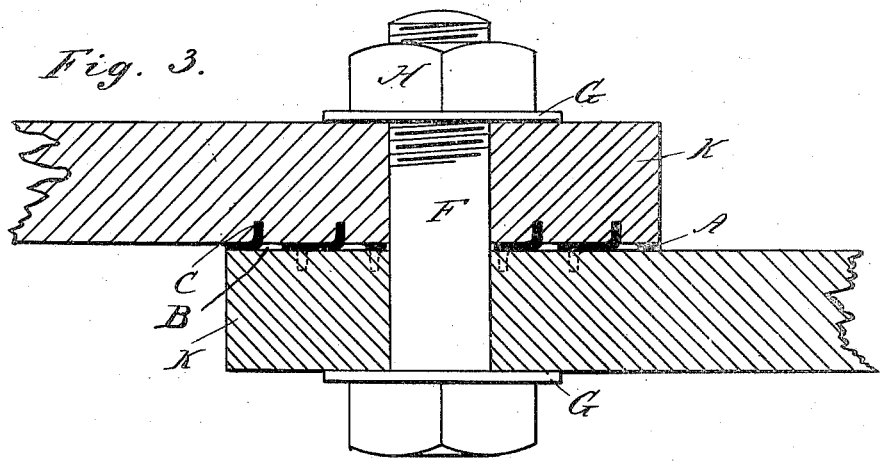

Figure 1 shows a plan, Fig. 2 an edge view, and Fig. 3 a section, of timbers with a screw-bolt and a nut and washer with this invention applied.

The same reference-marks indicate like parts in the several figures.

Referring to the drawings, A represents a plate of ductile metal; B, an aperture cut therein by a die or punch.

C are teeth formed by bending alternately up and down the portion of metal cut in making the aperture B, which metal is not severed from the plate A.

E is a bolt-hole.

F is a bolt passing through the bolt-hole E, washers G G, and pieces of lumber K K, and provided with a nut H.

More than one bolt-hole E and bolt F may be used in the same plate, and the plates may be made by casting. To use this invention the plate A is laid upon the pieces of lumber K K to be united and holes bored in the lumber to coincide with the hole E in the plate A. The plate A is then laid between the timber, the bolt F and washers G G applied, and the nut H screwed on until the timbers K K are pressed into intimate contact with the plate A and the teeth C sunk into the timbers K K.

Having described this invention, what I claim is—

As a new article of hardware manufacture, the plate A, having teeth C upon both sides thereof, and an aperture adapted to receive a screw-bolt, constructed substantially as and for the purpose set forth.

GEORGE W. ZEIGLER.

Witnesses:
J. DANIEL EBY,
VAN WYCK BUDD.